(12) United States Patent
Zinser

(10) Patent No.: US 8,107,578 B2
(45) Date of Patent: Jan. 31, 2012

(54) SYSTEM AND METHOD FOR FRAME SYNCHRONIZATION

(75) Inventor: Richard Louis Zinser, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 473 days.

(21) Appl. No.: 12/420,856

(22) Filed: Apr. 9, 2009

(65) Prior Publication Data

US 2010/0260298 A1    Oct. 14, 2010

(51) Int. Cl.
*H04L 7/00* (2006.01)
(52) U.S. Cl. ...................................................... 375/368
(58) Field of Classification Search .................. 375/354, 375/362, 365, 368; 370/395.62, 507; 455/265; 702/89; 713/375, 400
See application file for complete search history.

(56) References Cited

U.S. PATENT DOCUMENTS

| | | | |
|---|---|---|---|
| 6,058,150 A | 5/2000 | Ghosh | |
| 6,850,582 B2 | 2/2005 | O'Shea et al. | |
| 7,308,064 B2 * | 12/2007 | Kim et al. | 375/365 |
| 2004/0013209 A1 * | 1/2004 | Zehavi et al. | 375/334 |
| 2005/0100114 A1 * | 5/2005 | Satagopan et al. | 375/295 |
| 2006/0188009 A1 | 8/2006 | Litwin et al. | |
| 2007/0064814 A1 * | 3/2007 | Park et al. | 375/240.28 |

FOREIGN PATENT DOCUMENTS

| | | | |
|---|---|---|---|
| JP | 3006142 A | 1/1991 | |
| JP | 4208735 A | 7/1992 | |

* cited by examiner

*Primary Examiner* — Sam K Ahn
(74) *Attorney, Agent, or Firm* — Richard A. DeCristofaro

(57) ABSTRACT

A method for identifying receipt of a sync word in a stream of signal data is provided. The method includes receiving a signal value representing an incoming bit in the stream of signal data. The method also includes inserting the signal value into a first shift register having the same length as the sync word. The method further includes calculating a bit value from the signal value. The method also includes storing the bit value into a second shift register having the same length as the sync word. The method further includes counting the number of matches between the bit values in the second shift register and the corresponding bits in the sync word. The method also includes computing a correlation of the signal data and the sync word by summing the product of each signal value in the first shift register and the corresponding bit in the sync word. The method further includes producing a normalized correlation by dividing the correlation by the energy. The method also includes outputting a signal indicating the presence of a sync word if the number of matches is at least equal to a predetermined hard correlation threshold and if the normalized correlation is at least equal to a predetermined soft correlation threshold.

12 Claims, 5 Drawing Sheets

SYSTEM AND METHOD FOR FRAME SYNCHRONIZATION

BACKGROUND

The invention relates generally to communication systems and, in particular, to a system and method for synchronizing discrete frames of data transmitted as a continuous stream of digital data in a receiver.

The transmission of digital data over a radio frequency communication link is very often implemented by transferring the stream of digital data as discrete packets or frames (as opposed to a continuous homogeneous stream) of information from a transmitter to a receiver. Proper recovery of the digital information depends in part upon the receiver being in sync with the stream of incoming digital data packets. In general, apparatuses for synchronizing frames within a stream of digital data have been known in the art. Most of these prior art apparatuses provide for synchronization occurring at a particular repeating interval during the reception of an incoming digital data stream.

In a digital receiver, frame synchronization refers to determination of the location of a demarcated position within a received bit stream. Demarcation is generally implemented by inserting a fixed pattern of bits, referred to as a "sync word" into the bit stream. Location of the sync word is accomplished by matching a pattern embedded in the bit stream. Pattern matching is commonly performed using two techniques. One technique employs scanning the detected bits and searching for the best match, also referred to as 'hard match'. Another technique employs a cross-correlation technique on the detected bits, also referred to as 'soft correlation'.

In many applications, it is known a-priori that the sync word will be transmitted within a certain time period. For such an event, the synchronization decision rule includes an appropriate soft or hard match/correlation metric for all bit positions in the time period and selecting the location with a highest metric. However, in other applications, wherein no a-priori knowledge is available, incoming data stream must be continuously searched, and a "hard" decision must be made at every time position determining whether the sync word is present or not. Such an event results in a complex and time consuming process.

Therefore, an improved frame synchronization technique is desirable to address one or more of the aforementioned issues.

BRIEF DESCRIPTION

In accordance with an embodiment of the invention, a method for identifying receipt of a sync word in a stream of signal data is provided. The method includes receiving a signal value representing an incoming bit in the stream of signal data. The method also includes inserting the signal value into a first shift register having the same length as the sync word. The method further includes calculating a bit value from the signal value. The method also includes storing the bit value into a second shift register having the same length as the sync word. The method further includes counting the number of matches between the bit values in the second shift register and the corresponding bits in the sync word. The method also includes computing a correlation of the signal data and sync word by summing the product of each signal value in the first shift register and the corresponding bit in the sync word. The method further includes producing a normalized correlation by dividing the correlation by the energy. The method also includes outputting a signal indicating the presence of a sync word when both of the following conditions are true, one wherein the number of matches is at least equal to a predetermined hard correlation threshold and another being wherein the normalized correlation is at least equal to a predetermined soft correlation threshold.

In accordance with another embodiment of the invention, a system for identifying receipt of a sync word in a stream of signal data, wherein the sync word includes an ordered string of predetermined bits having a particular length. The system includes a first shift register having the same length as the sync word, the first shift register configured to receive a signal value representing an incoming bit in the stream of signal data. The system also includes a second shift register having the same length as the sync word, the second shift register configured to store a bit value calculated from the signal value. The system further includes a processor configured to count the number of matches between the bit values in the second shift register and the corresponding bits in the sync word. The processor is also configured to compute an energy of the signal data by summing the magnitude of the signal values in the first shift register. The processor is further configured to computing a correlation of the signal data and sync word by summing the product of each signal value in the first shift register and the corresponding bit in the sync word. The processor is also configured to produce a normalized correlation by dividing the correlation by the energy. The processor is further configured to output a signal indicating the presence of a sync word when both of the following conditions are true, one being the number of matches is at least equal to a predetermined hard correlation threshold and another being the normalized correlation is at least equal to a predetermined soft correlation threshold.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention include a system and method for frame synchronization. The system and method include a technique that combine a 'hard match' and 'soft correlation' technique. The technique provides an optimal estimate for decision thresholds by considering a trade off between two common error probabilities i.e. probability of missed detection and probability of false alarms. As used herein, the 'missed detection' is defined as failure to detect a sync word when it was actually transmitted. Similarly, the 'false alarm' is defined as detection of presence of sync word when it was not actually transmitted. An ideal scenario is considered when probabilities of the missed detection and false alarms are zero.

Figure 1:
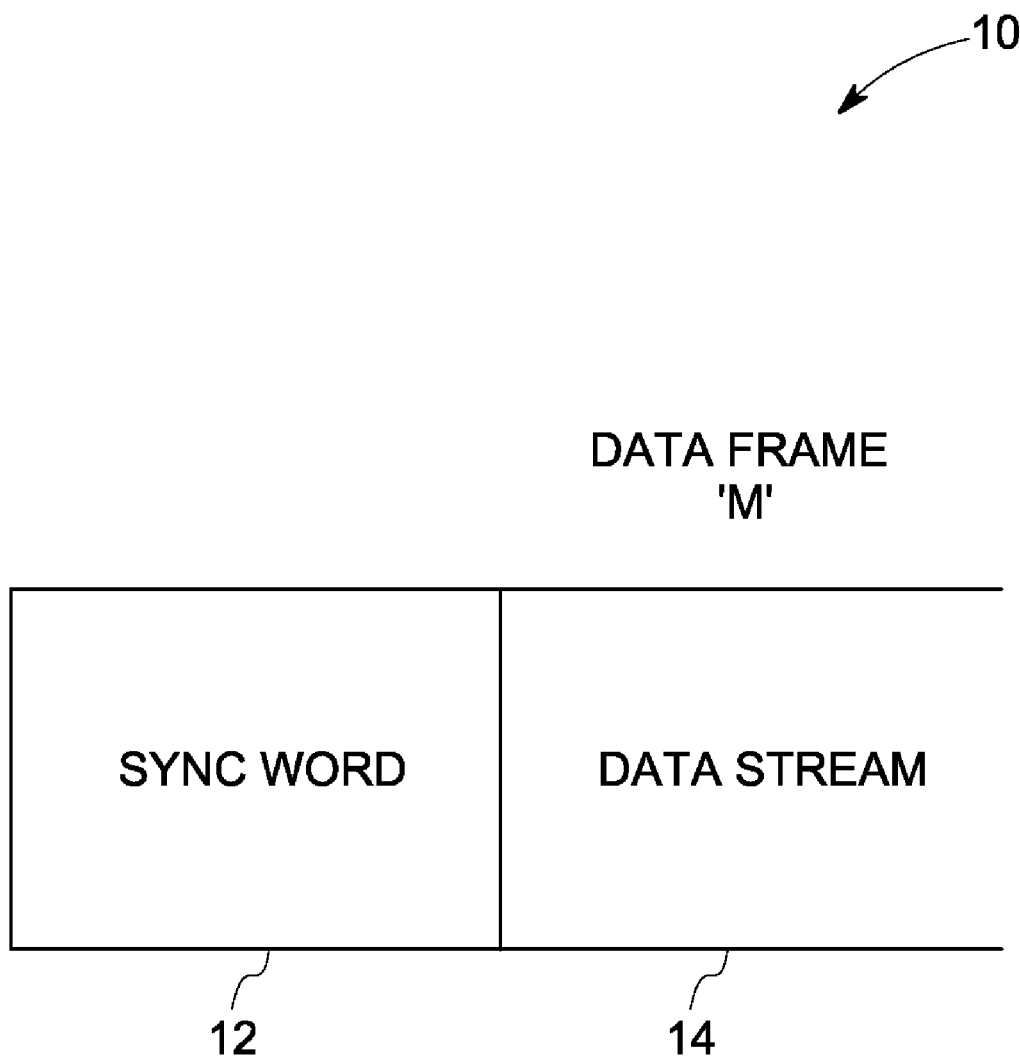
FIG. 1 is a schematic illustration of a typical data frame including a sync word in accordance with an embodiment of the invention.

FIG. 1 is a schematic illustration of a typical data frame 10 including a sync word 12 and data stream 14. The most common technique used in frame synchronization is the insertion of fixed data patterns, also referred to as 'sync words' at a start of the data frame 10 to assist synchronization. The purpose of frame synchronization is to isolate a position of the start of the data stream 14, which follows the sync word 12, as illustrated in FIG. 1. A compromise is necessary between the length of the sync word 12 to ensure minimal loss of synchronization and length of associated information bits in the data stream 14 to achieve an efficient data throughput. Data throughput refers to the amount of information bits (bits in the data stream 14) sent in the data frame 10 with respect to the total number of bits (includes the bits in the sync word) sent in the data frame 10.

To achieve frame synchronization, a receiver (not shown) continually searches a signal stream for sequence matching the known sync word 12 inserted at a transmitter. From a signal theory perspective, the receiver performs a cross correlation of the known sync word with the received signal stream. If the sync word is not present at a given point in time, the accumulated correlation will be low. When the frame sync word is present, however, the correlation should be nearly perfect, blemished only by an occasional detection error.

Figure 2:
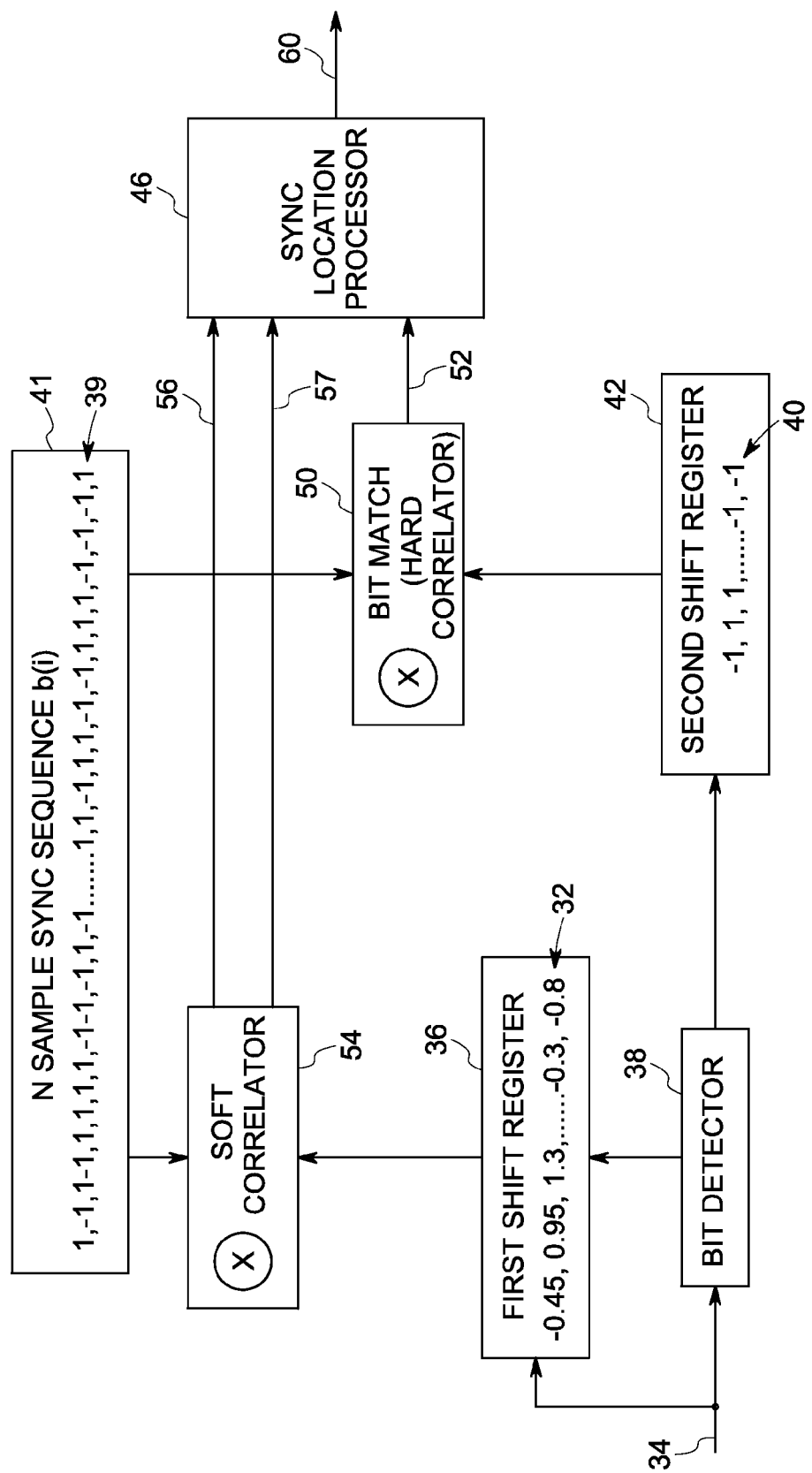
FIG. 2 is a block diagram representation of a receiver system that performs frame synchronization in accordance with an embodiment of the invention.

FIG. 2 is a block diagram representation of a receiver system 30 that performs frame synchronization. An incoming bit with an exemplary signal value 32 in a stream of signal data 34 is received by a first shift register 36. In one embodiment, the signal data 34 is a single sample per bit "soft value" representation of a binary non-return-to-zero signal. The soft values may be derived from the output of a demodulator stage, or an analog-to-digital conversion of an analog baseband signal. In this embodiment, a positive value may represent a binary 1, while a negative value may represent a binary 0. The first shift register 36 has a same length as that of a sync word in the stream of data. The first shift register 36 registers the signal value 32 that represents the incoming bit. In one embodiment, the first shift register 36 includes a first-in-first-out (FIFO) buffer. The signal data 34 is also passed to a bit detector 38, which quantizes the soft signal values to a value of +1 for a binary 1 and a -1 for a binary 0. The quantized values are passed to a second shift register 42 having the same length as a sync word 39 stores exemplary quantized bit values 40 calculated by bit detector 38. The length may be denoted by 'N'. A bit matching correlator 50 coupled to the second shift register 42 counts the number of matches between the bit values in the second shift register 42 and corresponding bits in the sync word 39 stored in a buffer 41. This may be referred to 'hard match' as referenced by numeral 52. Furthermore, the numeric values 56, 57 necessary to compute a normalized soft correlation are calculated by a soft correlation processor 54.

Computing the normalized soft correlation includes computing energy represented by numeral 57 of the signal data by summing the magnitude of the signal values in the first shift register 36. The energy E is given by:

$$E = \sum_{i=1}^{N} |r(i)| \qquad (1)$$

wherein r(i) is the $i^{th}$ 'soft' received signal value. The energy represents the overall strength or quality of the signal as received, without regard to the bit-value represented by any given portion of the signal.

A correlation, referenced by numeral 56 of the signal data is computed by summing the product of each signal value in the first shift register and the corresponding bit in the sync word. The correlation 'C' is given by:

$$C = \sum_{i=1}^{N} r(i)b(i) \qquad (2)$$

The correlation represents the magnitude of correspondence between the received signal values and the expected bit values that would be received if a sync word were being perfectly received by the receiver.

A normalized correlation denoted by 'C/E' is further produced by dividing the correlation by the energy. This normalization allows for the correlation calculated to be scaled according to how well-received a signal (based upon its energy) the correlation is based upon. In this way, a weak correlation in a high-quality signal does not produce a higher normalized correlation than a strong correlation in a poor-quality signal. The normalization also has the effect of limiting the C/E ratio to +/−1.0, allowing the use of a fixed threshold for detection. Sync location processor 46 outputs a signal 60 indicating the presence of a sync word when both of the following conditions are true. Firstly, the number of matches performed in the 'hard match' 52 is at least equal to a predetermined hard correlation threshold. Secondly, the normalized correlation generated by dividing the results of equation 2 (signal 56) by the results of equation 1 (signal 57) is at least equal to a predetermined soft correlation threshold. All of the processing steps in FIG. 2 may be implemented in a digital processor.

It should be noted that embodiments of the invention are not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware, software or firmware for performing the tasks of the invention, as will be understood by those skilled in the art.

Figure 3:
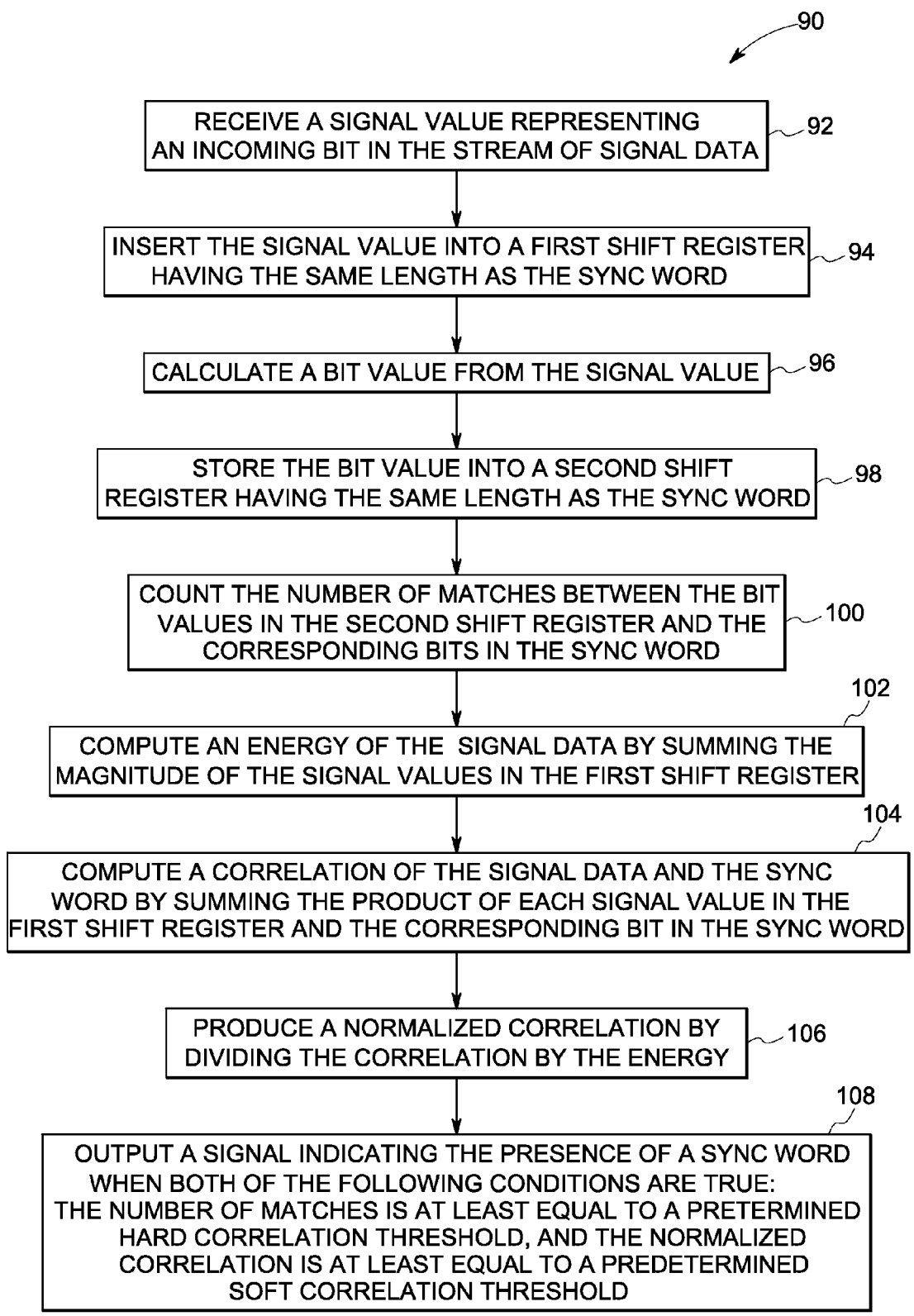
FIG. 3 is a flow chart representing steps in a method for identifying receipt of a sync word in a stream of signal data in accordance with an embodiment of the invention.

FIG. 3 is a flow chart representing steps in a method 90 for identifying receipt of a sync word in a stream of signal data, wherein the sync word includes an ordered string of predetermined bits having a particular length. The method 90 includes receiving a signal value representing an incoming bit in the stream of signal data in step 92. The signal value is inserted into a first shift register having the same length as the sync word in step 94. In one embodiment, the first shift register includes a first-in-first-out buffer. A bit value is calculated from the signal value in step 96. The bit value is stored into a second shift register having the same length as the sync word in step 98. In a particular embodiment, the incoming bits are shifted either to right or left in order to discard an oldest bit. The number of matches between the bit values in the second shift register and the corresponding bits in the sync word are counted in step 100. Furthermore, energy of the signal data is computed by summing the magnitude of the signal values in the first shift register in step 102. A correlation of the signal data is computed by summing the product of each signal value in the first shift register and the corresponding bit in the sync word in step 104. A normalized correlation is produced by dividing the correlation by the energy in step 106. A signal is output indicating presence of a sync word in step 108 when both of the following conditions are true. A first condition is that the number of matches must at least equal a predetermined hard correlation threshold and a second condition being the normalized correlation is at least equal to a predetermined soft correlation threshold. In one embodiment, a next incoming bit is processed in case the number of matches is less than the predetermined hard correlation threshold. In another embodiment, the normalized correlation is less than or equal to 1. In yet another embodiment, the signal output is fed into a control processor to indicate the beginning of a new received message.

Figure 4:
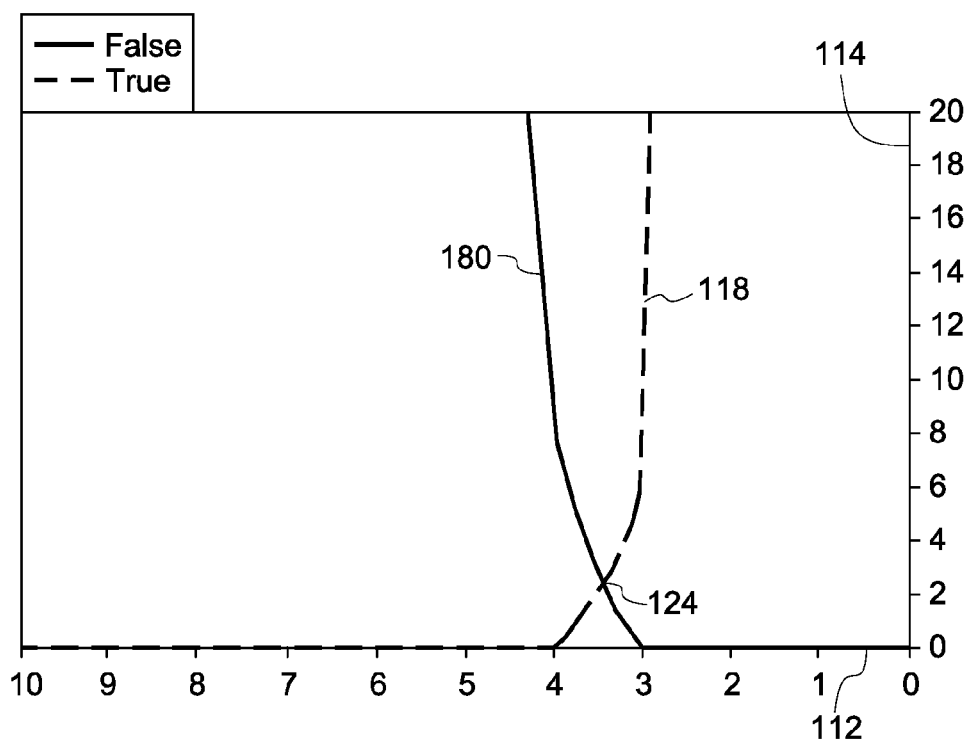
FIG. 4 is a graphical illustration of an exemplary number of observations of the error count in the sync word both with and without the sync word actually being present, which is used while employing the hard match technique.
Figure 5:
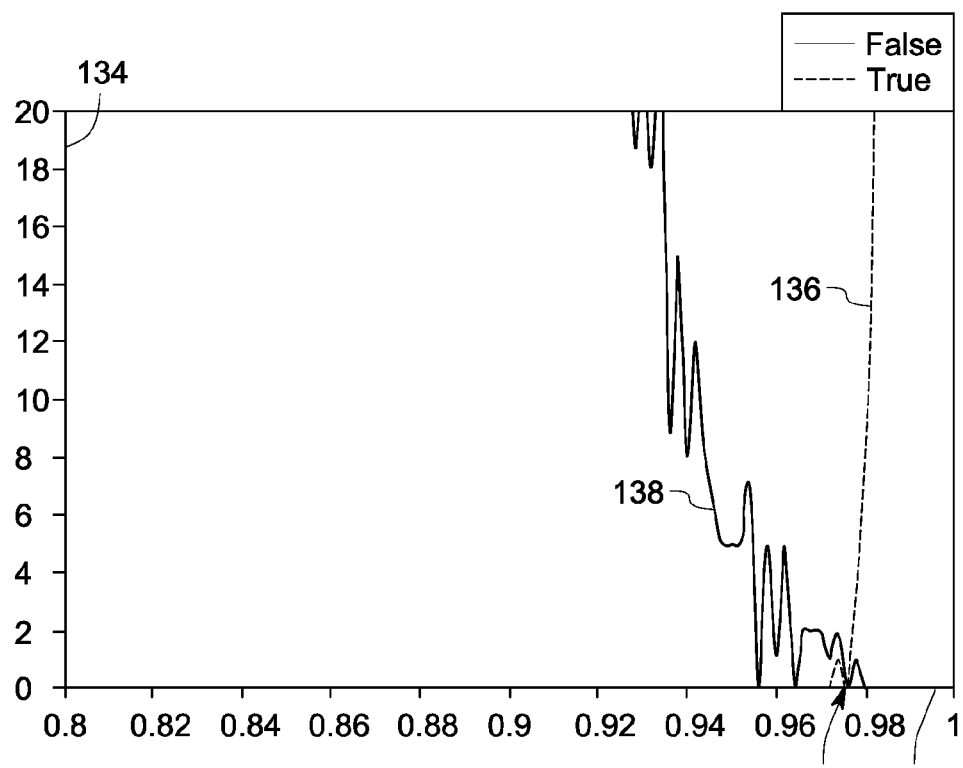
FIG. 5 is a graphical illustration of an exemplary number of observations of the normalized correlation values both with and without the sync word actually being present, which is used while employing the soft correlation technique.
Figure 6:
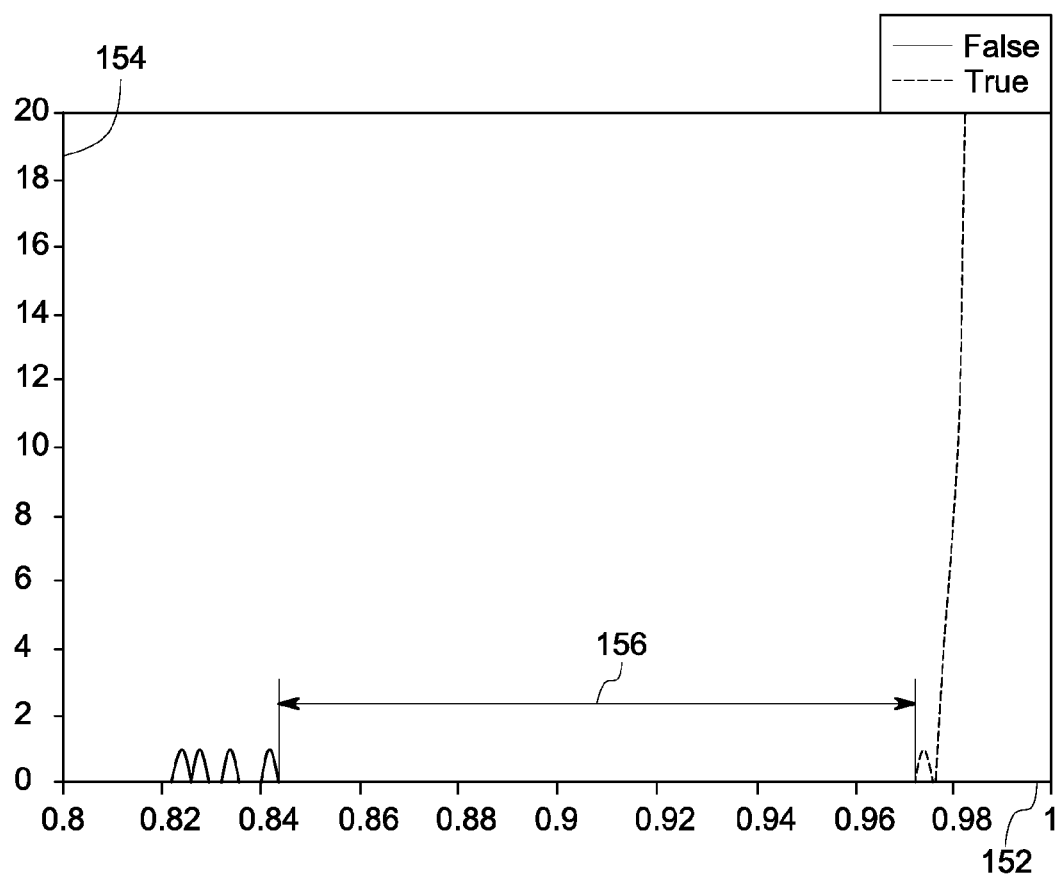
FIG. 6 is a graphical illustration of an exemplary number of observations of normalized correlation values both with and without the sync word actually being present, under the constraint of employing a hybrid combination of the hard and soft correlation technique with 4 allowed errors.

FIGS. 4-6 are graphical illustrations of number of observations of the number of hard sync errors and normalized correlations while employing the hard match technique, the soft correlation technique and a combination of the hard match and soft match respectively as discussed above. A 41 bit synchronization word was employed for the simulation. The simulation was also run with an energy per bit to noise power spectral density ratio (Eb/NO) of about 12 dB that yielded a hard decoded bit rate of about $1 \times 10^{-4}$. 400 million bit intervals were run through the simulation with 2,247,231 embedded sync words, which accounted for 26% of transmitted bits. The remaining bit intervals contained either randomly selected bits or white noise. As illustrated in FIG. 4, the X-axis 112 represents the count of hard sync errors, while the Y-axis 114 represents number of observations of the count. Curve 118 represents a count of hard sync errors when the sync word was actually present (TRUE) and curve 120 represents a count hard sync errors when the sync word was not present (FALSE). As illustrated herein, no received sequence that did not actually contain the sync word produced less than 3 hard errors, while no received sequence that actually contained the sync word produced more than 4 hard errors. For this data, an optimum decision threshold for sync detection would lie at a point 124 of intersection of the two curves 118 and 120.

FIG. 5 is a graphical illustration representing the soft correlation technique. The X-axis 132 represents normalized soft correlation while the Y-axis 134 represents number of observations of the normalized soft correlation. Curve 136 represents the count of observations when the sync word is actually present (TRUE), while curve 138 represents the count of observations when the sync word has not been transmitted (FALSE). As illustrated herein, the number of observed correlation values reaches 0 below about 0.97 when the sync word is actually present and it increases rapidly for values above 0.97. Similarly, the number of observed correlation values reaches 0 above a value of about 0.98 when the sync word is not present and increases rapidly below a value of about 0.97. The curves 136 and 138 intersect at about 0.975 referenced by numeral 142. Note that the two curves overlap for a small range of correlation values, indicating that the threshold of 0.975 will produce some false alarms and missed detections.

FIG. 6 is a graphical illustration of number of the observed normalized soft correlation values employing a hybrid combination of the hard and soft correlation technique with 4 allowed hard sync errors. The X-axis 152 represents normalized correlation while the Y-axis 154 represents number of observations of the normalized soft correlation values. The number of observed correlation values is 0 below about 0.97 when the sync word is actually present while the number of observed correlation values when the sync word is not present is 0 between above about 0.845. Thus, there is a large region 156 where there is no overlap of the curves, which is an ideal scenario.

The various embodiments of a system and method for frame synchronization described above thus provide a way to achieve a convenient and efficient means of synchronizing data frames. The technique is more robust than either soft or hard correlation techniques in standalone mode, as illustrated by the wide non-overlapping region 156 in FIG. 6.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of a first-in-first-out buffer with respect to one embodiment can be adapted for use with a binary non-return-to-zero signal described with respect to another. Similarly, the various features described, as well as other known equivalents for each feature, can be mixed and matched by one of ordinary skill in this art to construct additional systems and techniques in accordance with principles of this disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A method for identifying receipt of a sync word in a stream of signal data, the sync word comprising an ordered string of predetermined bits having a particular length, the method comprising:

receiving a signal value representing an incoming bit in the stream of signal data via a first shift register;

inserting the signal value into a first shift register having the same length as the sync word;

calculating a bit value from the signal value;

storing the bit value into a second shift register having the same length as the sync word;

counting the number of matches between the bit values in the second shift register and the corresponding bits in the sync word;

computing an energy of the signal data by summing the magnitude of the signal values in the first shift register;

computing a correlation of the signal data and the sync word by summing the product of each signal value in the first shift register and the corresponding bit in the sync word;

producing a normalized correlation by dividing the correlation by the energy; and outputting a signal indicating the presence of a sync word when both of the following conditions are true:
  the number of matches is at least equal to a predetermined hard correlation threshold; and
  the normalized correlation is at least equal to a predetermined soft correlation threshold.

2. The method of claim 1, wherein the first shift register comprises a first-in first-out buffer.

3. The method of claim 1, wherein said storing comprises shifting either to right or left, the incoming bits in the first shift register in order to discard an oldest bit.

4. The method of claim 1, comprising processing a next incoming bit in case the number of matches is less than the predetermined hard correlation threshold.

5. The method of claim 1, wherein the signal output is fed into a control processor to indicate the beginning of a new received message.

6. A system for identifying receipt of a sync word in a stream of signal data, the sync word comprising an ordered string of predetermined bits having a particular length, the method comprising:
  a first shift register having the same length as the sync word, the first shift register configured to receive a signal value representing an incoming bit in the stream of signal data;
  a second shift register having the same length as the sync word, the second shift register configured to store a bit value calculated from the signal value;
  a processor configured to:
    count the number of matches between the bit values in the second shift register and the corresponding bits in the sync word;
    compute an energy of the signal data by summing the magnitude of the signal values in the first shift register;
    compute a correlation of the signal data and the sync word by summing the product of each signal value in the first shift register and the corresponding bit in the sync word;
    produce a normalized correlation by dividing the correlation by the energy; and
    output a signal indicating the presence of a sync word when both of the following conditions are true:
      the number of matches is at least equal to a predetermined hard correlation threshold; and
      the normalized correlation is at least equal to a predetermined soft correlation threshold.

7. The system of claim 6, wherein said system comprises a digital radio receiver.

8. The system of claim 6, wherein said processor comprises a gate array.

9. The system of claim 6, wherein the first shift register comprises a first-in first-out (FIFO) buffer.

10. The system of claim 6, wherein the second shift register stores each of the incoming bits into a head end.

11. The system of claim 6, wherein the sync word comprises a sequence of +1 and −1 symbols, representing '1' and '0' bits.

12. The system of claim 6, wherein the signal data comprises a binary non-return-to-zero modulating signal.

\* \* \* \* \*